C. A. BLUHM.
TRAIN PIPE COUPLING.
APPLICATION FILED DEC. 21, 1920.

1,427,716.

Patented Aug. 29, 1922.
2 SHEETS—SHEET 1.

Inventor
Charles A. Bluhm
By Vernon E. Hodge
his Atty.

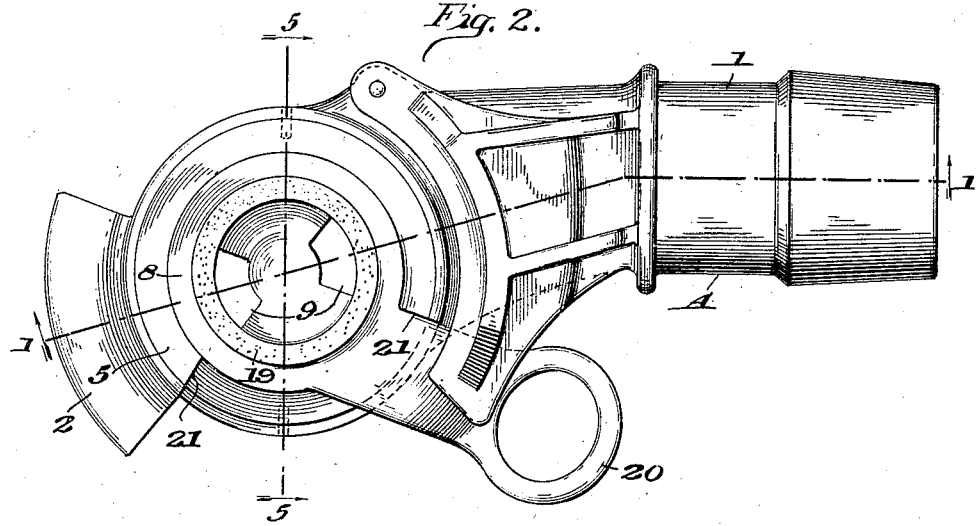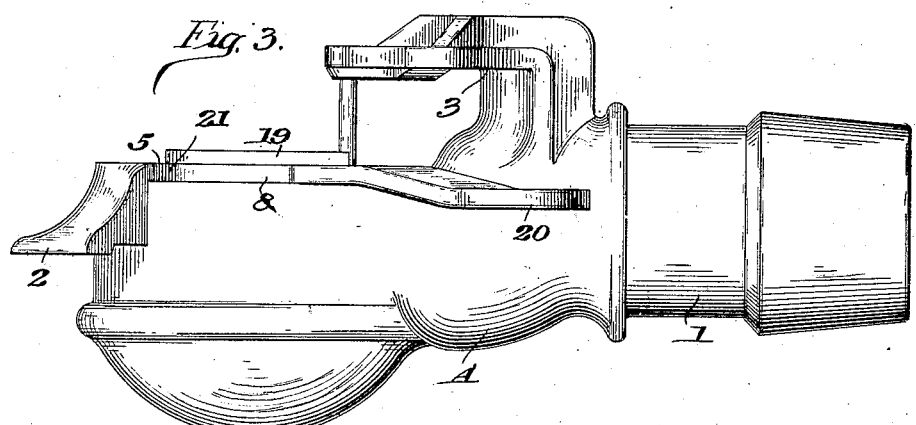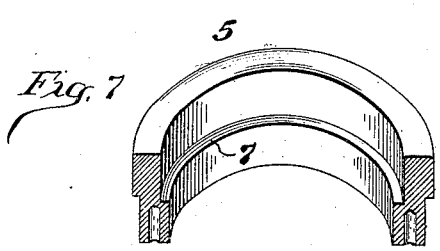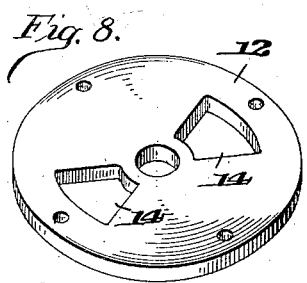

UNITED STATES PATENT OFFICE.

CHARLES A. BLUHM, OF MICHIGAN CITY, INDIANA.

TRAIN-PIPE COUPLING.

1,427,716.  Specification of Letters Patent.  Patented Aug. 29, 1922.

Application filed December 21, 1920. Serial No. 432,295.

*To all whom it may concern:*

Be it known that I, CHARLES A. BLUHM, a citizen of the United States, residing at Michigan City, in the county of Laporte and State of Indiana, have invented certain new and useful Improvements in Train-Pipe Couplings, of which the following is a specification.

My invention relates to an improvement in pipe couplings, and pertains more particularly to couplings of that type used to connnect the air hose in the brake supply line of a train between two cars, and thus establish communication between the air pipe of one car and the air pipe of the car next in line.

The object of this invention is to eliminate the angle cock of a train pipe as now in use, establish the valve in the coupler-head, and provide a coupling in which the passage for the air is through the valve in the coupler body, and is cut in and out by a lever of the valve head when the air in the train line is on.

A further object of this invention in its construction is to eliminate waste of air and to simplify operation by a lever of the valve-head in the coupler-body.

In the accompanying drawings:

Fig. 2 is a top plan view of one of the coupler members;

Fig. 3 is a side elevation thereof;

Fig. 7 is a fragmentary view of the brass rim or valve-seat;

Fig. 8 is a view of the metal valve seat.

Figure 1:
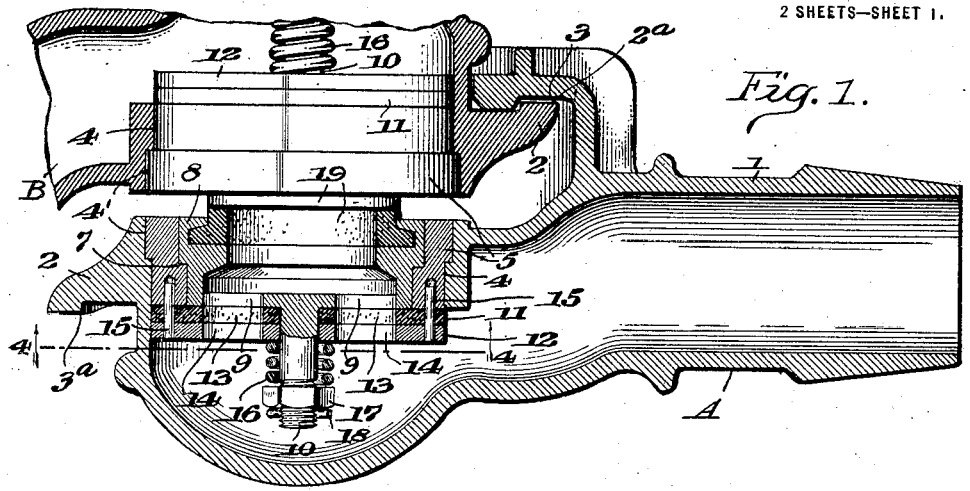
Fig. 1 is a longitudinal vertical sectional view through the two members coupled together, to show the relation of the parts when in a position that air is permitted to flow from one pipe to the other.
Figure 4:
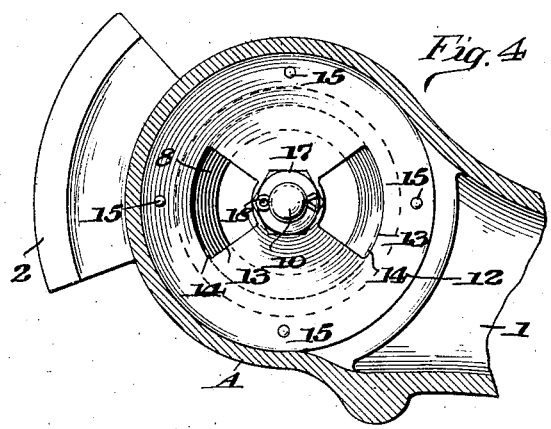
Fig. 4 is a face view of the end of the valve of the coupler-body.
Figure 6:
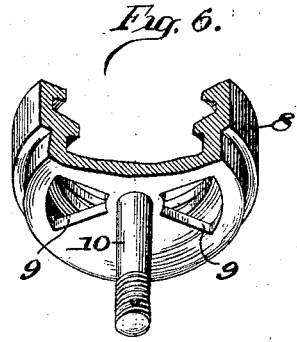
Fig. 6 is a fragmentary view of the valve-head.
Figure 5:
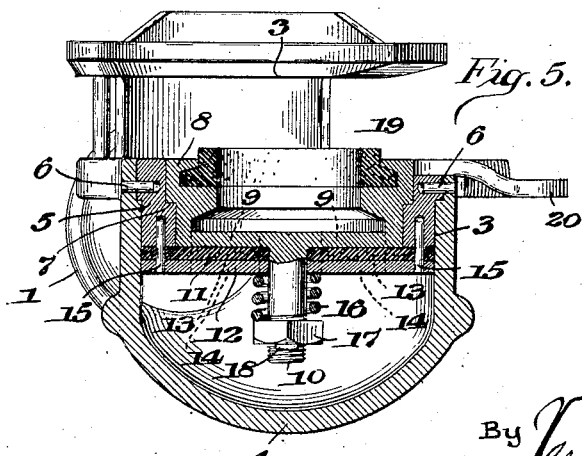
Fig. 5 is a transverse vertical sectional view through the valve and coupler body on line 5—5 of Fig. 1, showing the lever of the valve head in position.

The casing A is of the usual form and comprises a tubular extension 1, over which a flexible hose (not shown) is held, which in turn is connected at its other end to the train air pipe. The member A is intended to be coupled and held to a similar member B by the usual hook 2 in a grooved flange 3 which interlocks with similar parts 2ª and 3ª on the member B. As the members A and B are exact duplicates, and in fact all of the couplers supplied upon the cars of a road would be identical so that they could be interchangeable as it were, when different cars are brought together, I shall therefore describe only the member A.

The coupler member is on its body portion cored out, as at 4. This cored out portion is open at both ends, and is on a larger diameter at the top, as at 4′ to receive the flanged body portion 5 of the valve, the latter being held against rotation by the radial pins 6, 6. The body portion 5 is internally flanged as at 7 to receive a valve-head 8 open at its upper end and provided in its lower end with ports 9, 9. This valve head is also provided on its lower end with a projecting threaded stem 10. 11, indicates a rubber gasket received upon the stem 10, and 12 indicates a similar disk received upon the stem 10, both being provided with ports 13 and 14 respectively, which are adapted to register with the ports 9, 9, in the body portion of the valve. The gasket 11 and the disk 12 are held against rotation by means of pins 15, 15, inserted into the body portion 5 of the valve, these members being preferably seated against the valve by means of spring 16 received upon the stem 10 and held under compression by means of a nut 17 and a cotter-pin 18. The upper end of the valve-head is provided with a rubber gasket 19 to form an air-tight connection between the two coupling members when interlocked.

An actuating lever 20 is arranged on the extreme upper end, and is adapted to extend laterally therefrom, a portion of the housing being cut away, thereby forming the abutments 21 to limit the movement of the valve 20.

In construction, the several parts of the valve are assembled within the body portion 5, after which the latter is pressed in the bore of the coupling body.

From the foregoing, it will be seen that I have provided a coupling member which is of very few parts, easy in assembly and operation, one with which there is little danger of the parts being disarranged, and one wherein the valves are actuated manually and independently of the members.

I claim:

1. A pipe coupling comprising a coupler member constructed to have interlocking connection with a duplicate member, a valve arranged in the passage of the coupler member comprising a stationary body member provided with ports at the lower end thereof, a rotatable member open at its upper end and provided with ports at the lower end, an actuating arm extending laterally of the rotatable member and outside of the coupling member, whereby the ports of the rotatable member and the stationary member may be brought into and out of registry.

2. A stationary body member provided with ports at the lower end thereof, a rotatable member received within said stationary member and provided with a stem extending therethrough, said rotatable member being open at the upper end and provided with ports at the lower end, a spring interposed between the lower end of the stem and the bottom of said stationary member, whereby the members are held together, said rotatable member being provided with an actuating arm extending laterally therefrom and outside of the coupling-member, whereby the ports of the rotatable member and the stationary member may be brought into and out of registry.

3. A pipe coupling comprising a coupling member constructed to have interlocking connection with a duplicate member, valves arranged in the aligned passages of each member, comprising a stationary body portion received in said aligned passage member provided with ports at the lower end thereof, a rotatable member received in said stationary member, open at its upper end and provided with ports at the lower end which are adapted to register with the ports of the stationary member, a stem projecting from the rotatable member through the bottom of said stationary member, a spring interposed between the outer end of said stem and the bottom of said stationary member, whereby the members are held together, a gasket arranged on the upper edge of the rotatable member, and an actuating arm arranged at the extreme upper end of said rotatable member adapted to extend laterally therefrom through a recess formed in the body member of the coupling body.

4. A coupling comprising a coupling member constructed to have an interlocking connection with a duplicate member, valves arranged in the aligned passages of each member comprising a stationary body member, a rotatable inner member open at the upper end and provided with ports at the lower end, a stationary disk carried by the stationary body member, provided with ports adapted to register with the ports of the rotatable member, a stem projecting from the rotatable member and through the stationary disk, and provided with a spring for holding said rotatable member and stationary disk together, and an actuating arm arranged at the upper end of said rotatable member adapted to extend laterally therefrom, whereby the port in the rotatable member and the disk may be brought into and out of registry.

5. A coupling comprising a coupling member constructed to have interlocking connection with a duplicate member, valves arranged in the aligned passages of each member, comprising a stationary body member, a rotable inner member open at the upper end and provided with ports at the lower end, a stationary disk carried by the stationary body member, provided with ports adapted to register with the ports of the rotatable member, a gasket provided with ports arranged between said stationary disk and said rotatable member, a stem projecting from the rotatable member through the openings in the gasket and stationary disk, a spring interposed between the outer end of the stem and the stationary disk, whereby the several members are held together, an actuating arm arranged at the upper end of said rotatable member, adapted to extend laterally therefrom through a recess in the body of the coupling, and a gasket arranged at the upper open end of the rotatable member, whereby an air-tight connection is made between the interlocking coupling members.

In testimony whereof I affix my signature.

CHARLES A. BLUHM.